United States Patent
Mueck et al.

(10) Patent No.: US 9,077,493 B2
(45) Date of Patent: Jul. 7, 2015

(54) SYSTEM AND METHOD FOR ESTABLISHING A LOCALIZED SINGLE FREQUENCY NETWORK

(75) Inventors: Markus Mueck, Unterhaching (DE); Maik Bienas, Braunschweig (DE)

(73) Assignee: Intel Mobile Communications GmbH, Neubiberg (DE)

( * ) Notice: Subject to any disclaimer, the term of this patent is extended or adjusted under 35 U.S.C. 154(b) by 975 days.

(21) Appl. No.: 12/425,525

(22) Filed: Apr. 17, 2009

(65) Prior Publication Data

US 2010/0266055 A1    Oct. 21, 2010

(51) Int. Cl.
| | |
|---|---|
| *H04K 1/10* | (2006.01) |
| *H04L 27/28* | (2006.01) |
| *H04L 5/00* | (2006.01) |
| *H04B 7/02* | (2006.01) |
| *H04B 7/12* | (2006.01) |
| *H04B 17/00* | (2015.01) |
| *H04L 25/02* | (2006.01) |
| *H04W 52/34* | (2009.01) |

(52) U.S. Cl.
CPC .............. *H04L 5/0044* (2013.01); *H04B 7/022* (2013.01); *H04B 7/12* (2013.01); *H04B 17/0085* (2013.01); *H04L 5/0007* (2013.01); *H04L 5/0039* (2013.01); *H04L 25/022* (2013.01); *H04W 52/346* (2013.01)

(58) Field of Classification Search
CPC ....... H04B 17/0085; H04B 7/022; H04B 7/12
USPC .......................................... 375/260, 267, 295
See application file for complete search history.

(56) References Cited

U.S. PATENT DOCUMENTS

| | | |
|---|---|---|
| 5,933,421 A | 8/1999 | Alamouti et al. |
| 6,744,823 B1 | 6/2004 | Kamemura et al. |
| 6,853,629 B2 | 2/2005 | Alamouti et al. |
| 7,010,048 B1 | 3/2006 | Shattil |
| 7,084,833 B2 | 8/2006 | Pintos et al. |
| 7,286,611 B2 | 10/2007 | Kamemura et al. |
| 7,453,792 B2 | 11/2008 | Chadha et al. |
| 7,526,036 B2 | 4/2009 | Mehta et al. |
| 7,593,316 B2 | 9/2009 | Gerlach |

(Continued)

FOREIGN PATENT DOCUMENTS

| | | |
|---|---|---|
| CN | 1829372 A | 9/2006 |
| CN | 1856945 A | 11/2006 |

(Continued)

OTHER PUBLICATIONS

N. Ahmed et al., "Cooperative Communications in the Fading Channel", Rice University, 6100 S. Main St., Houston, USA, pp. 1-7.

(Continued)

*Primary Examiner* — Freshteh N Aghdam
(74) *Attorney, Agent, or Firm* — Schwabe, Williamson & Wyatt, P.C.

(57) ABSTRACT

A method, wireless communication network, and transmitting device that detects that one or more carrier frequencies have crossed a threshold, selects one or more helping transmitting devices to transmit the detected carrier frequencies, transmits the data assigned to the detected carrier frequencies to the selected helping transmitting devices, wherein the selected helping transmitting devices transmit the data over the detected carrier frequencies.

22 Claims, 6 Drawing Sheets

(56) References Cited

U.S. PATENT DOCUMENTS

| | | | |
|---|---|---|---|
| 7,720,020 | B2* | 5/2010 | Larsson ................... 370/315 |
| 7,912,162 | B2 | 3/2011 | Mueller-Weinfurtner |
| 8,090,004 | B2 | 1/2012 | Kobayashi et al. |
| 8,417,259 | B2 | 4/2013 | Sennett |
| 2004/0156309 | A1 | 8/2004 | Chadha et al. |
| 2008/0063097 | A1* | 3/2008 | Horiuchi et al. ............ 375/260 |
| 2009/0017837 | A1* | 1/2009 | Kim et al. ................ 455/456.1 |
| 2009/0088165 | A1* | 4/2009 | Shen et al. .................. 455/436 |
| 2010/0157901 | A1* | 6/2010 | Sanderovitz et al. ........ 370/328 |
| 2011/0064059 | A1* | 3/2011 | Hooli et al. ................. 370/332 |
| 2012/0020319 | A1 | 1/2012 | Song et al. |

FOREIGN PATENT DOCUMENTS

| | | |
|---|---|---|
| CN | 101164247 A | 4/2008 |
| CN | 101373998 A | 2/2009 |
| WO | 2003086000 A1 | 10/2003 |
| WO | 2007/123029 A1 | 11/2007 |
| WO | 2008/155764 A2 | 12/2008 |

OTHER PUBLICATIONS

E. Larsson et al., "Cooperative Transmit Diversity Based on Superposition Modulation", http://www.ee.kth.se/php/modules/publications/reports/2005/KT-0508.pdf, pp. 1-3.

R. Nabar et al., "Fading Relay Channels: Performance Limits and Space-Time Signal Design", Swiss Federal Institute of Technology (ETH) ZürichFeb. 2004, pp. 1-38.

A. Scaglione et al., "Cooperative Communications in Mobile Ad-Hoc Networks: Rethinking the Link Abstraction", pp. 1-21.

Hsin-Yi Shen, "Introduction for Cooperative Diversity and Virtual MIMO", Apr. 27, 2007, Rensselaer Polytechnic Institute, pp. 1-20.

K. Kusume et al., "Efficient Tomlinson-Harashima Precoding for Spatial Multiplexing on Flat MIMO Channel", DoCoMo Communications Laboratories Europe GmbH, IEEE Xplore, pp. 2021-2025.

S. Shi et al., "Precoding and Power Loading for Multi-Antenna Broadcast Channels", Proc. 38th. Annual Conference on Information Sciences and Systems (CISS), Princeton, USA, Mar. 2004, pp. 1-6.

H. Zhang et al., "Base Station Cooperation for Multiuser MIMO: Joint Transmission and BS Selection", 2004 Conference on Information Sciences and Systems, Princeton University, Mar. 17-19, 2004, pp. 1-6.

A. Chindapol et al., IEEE 802.16 Broadband Wireless Access Working Group, Clarification on Cooperative Relaying, Sep. 2007, pp. 1-3.

A. Jardine et al., IEEE Xplore, Release 2.5, "MIMO Cooperative Diversity Strategies for Frequency Selective Fading Relay Channels", Vehicular Technology conference, 2006, VTC-2006 Fall. 2006 IEEE 64th, Sep. 25-28, 2006, pp. 1.

Office action received for China Patent Application No. 201010167768.X, mailed on Oct. 9, 2013, 7 pages of Office action and 11 pages of English translation.

Office action received for China Patent Application No. 201010167768.X, mailed on May 3, 2013, 4 pages of Office action and 6 pages of English translation.

Office action received for China Patent Application No. 201010167768.X, mailed on Sep. 5, 2012, 5 pages of Office action and 8 pages of English translation.

Chinese Patent Office; "Decision of Rejection" for Chinese App. No. 201010167768.X; mailed Apr. 3, 2014; 15 pages inclusive of English translation.

Indian Patent Office; First Examination Report for Indian App. No. 355/KOL/2010 dated Feb. 16, 2015; 2 pages.

* cited by examiner

FIG. 7

SYSTEM AND METHOD FOR ESTABLISHING A LOCALIZED SINGLE FREQUENCY NETWORK

BACKGROUND OF THE INVENTION

Cellular communication systems establish wireless communication links between user equipment (UE) and base stations (BS) to transmit and receive data. Cellular communication systems typically transmit data in a multipath environment. In a multipath environment, a transmitted signal will reflect off several surfaces before reaching the intended receiver. A multipath environment results in receiving a transmitted signal convolved with a channel impulse response of the environment the transmitted signal traveled through. A multipath environment will also cause a transmitted signal to take multiple paths to the intended receiver. Because some paths may be longer than others, multiple time-delayed signals will cause additive and subtractive interference when time-delayed versions of the transmitted signal are summed together.

Poor channel impulse response characteristics and multipath delay are problematic for multi-carrier modulation schemes because either may cause strong attenuation of subcarriers. Strongly attenuated subcarriers have low signal-to-noise ratios, and thus it is difficult or impossible to demodulate and decode the information contained on them. In such cases, link reliability and quality of service are negatively impacted.

SUMMARY OF THE INVENTION

Embodiments of the invention provide methods, wireless communication networks, and transmitting devices that transmit one or more carrier frequencies, detect that at least one of the transmitted carrier frequencies have crossed a threshold, select one or more helping transmitting devices to transmit the detected carrier frequencies, and transmit the data assigned to the detected carrier frequencies to the selected helping transmitting devices, wherein the selected helping transmitting devices transmit the data over the one or more carrier frequencies.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION OF ILLUSTRATIVE EMBODIMENTS

Modulation schemes that include multicarrier frequencies and allow for the operation of a single frequency network may be used in accordance with various embodiments of the invention. Examples of multicarrier modulation schemes include Orthogonal Frequency-Division Multiplexing (OFDM) and Orthogonal Frequency-Division Multiple Access (OFDMA). Specific OFDM and OFDMA schemes are defined under the Worldwide Interoperability for Microwave Access (WiMAX) specification and will be included in fourth generation wireless interfaces. Other OFDM/A schemes which may be used in accordance with various embodiments of the invention include Wi-Fi (IEEE 802.11a/b/g/n based), 3GPP LTE (Long Term Evolution), 3GPP LTE-Advanced, DVB-T, DVB-H, T-DMB, ISDB-T, MediaFLO forward link, DAB/EUREKA 147, DAB+, Digital Radio Mondiale, HD Radio, T-DMB, ISDB-TSB, Flash-OFDM, High Speed OFDM Packet Access (HSOPA), IEEE 802.20, IEEE 802.16e (Mobile WiMAX), WiBro, wireless Personal Area Network (PAN), and the Ultra wideband (UWB) IEEE 802.15.3a implementation suggested by WiMedia Alliance.

Figure 1:
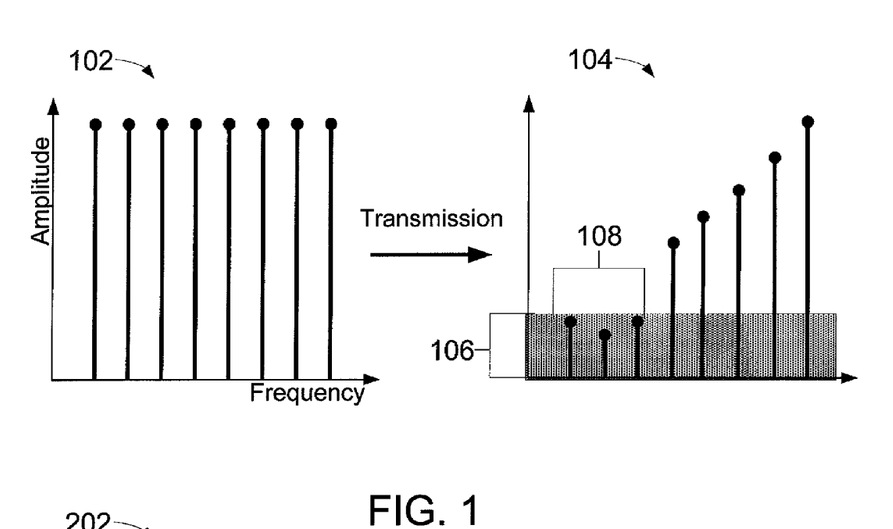
FIG. 1 is a graphical representation of subcarriers transmitted in a multipath environment.

Whichever multicarrier modulation scheme is employed, subcarrier attenuation will occur when used in a multipath environment. FIG. 1 shows a graphical representation of subcarriers transmitted in a multipath environment. Subcarriers 102 are separated in the frequency domain by transmitting unique carrier frequencies. Subcarriers 102 are transmitted to a receiving device. Received subcarriers 104 have lower amplitudes than subcarriers 102 due to a poor impulse response of the environment subcarriers 102 were transmitted through and/or multipath delay. Strongly attenuated subcarriers 108 are within the transmission noise 106. The transmission noise 106 is inherent in any communication system. Because the amplitudes of strongly attenuated subcarriers 108 are lower than the transmission noise 106, it is difficult or impossible to separate the strongly attenuated subcarriers 108 from transmission noise 106 for demodulating and decoding the information contained on strongly attenuated subcarriers 108. To a receiving device, strongly attenuated subcarriers 108 may appear as a part of transmission noise 106.

Figure 2:
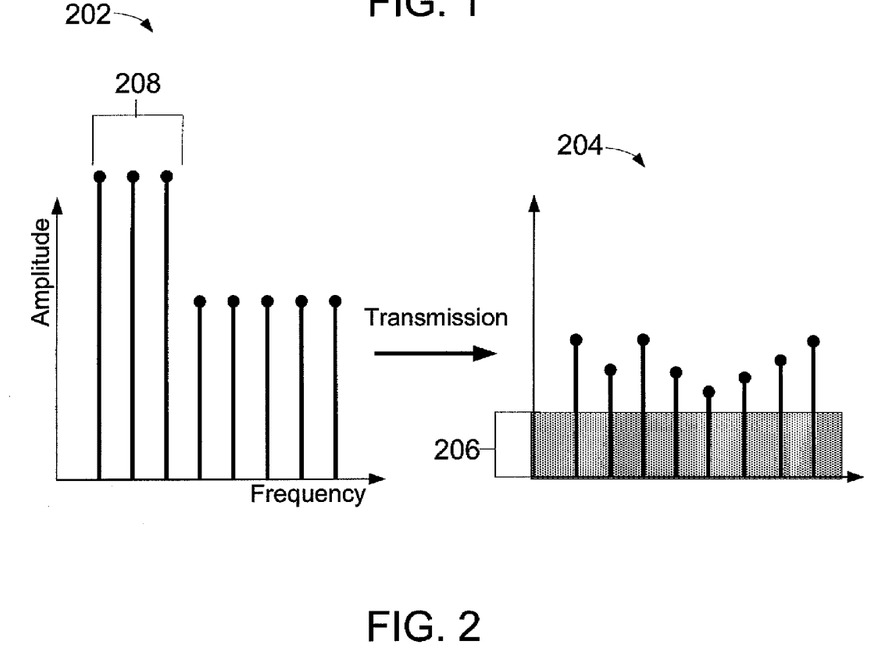
FIG. 2 shows a conventional technique addressing attenuated subcarriers.

FIG. 2 shows a conventional technique for addressing attenuated subcarriers. The technique "power loads" expected attenuated subcarriers 208 by transmitting expected attenuated subcarriers 208 with a higher amplitude to match the expected attenuation level. Subcarriers 202 are transmitted to a receiving device. The amplitudes of received subcarriers 204 are all above transmission noise 206 and thus are able to be demodulated and decoded.

Because a base station has limited resources, however, power loading expected attenuated subcarriers 208 requires reducing in amplitude the other subcarriers of subcarriers 202 to meet a total output power budget of a base station. Thus, a base station, or other transmission device, is limited in how much of a boost that can be added to expected attenuated subcarriers 208. Further, power loading may considerably increase the interference level in cells that neighbor the base station that is boosting subcarriers.

According to various embodiments of the invention, it is possible to spread power requirements for boosting subcarrier signal strength among multiple transmitting devices and avoid increasing interference levels in neighboring cells. As detailed below, embodiments of the invention provide a method of creating a localized frequency network that detects one or more carrier frequencies crossing a threshold, selects one or more helping transmitting devices to transmit the one or more detected carrier frequencies, transmits data assigned to the detected carrier frequencies to the selected helping transmitting devices, and transmits the data over the detected carrier frequencies by the selected helping transmitting devices.

Figure 3:
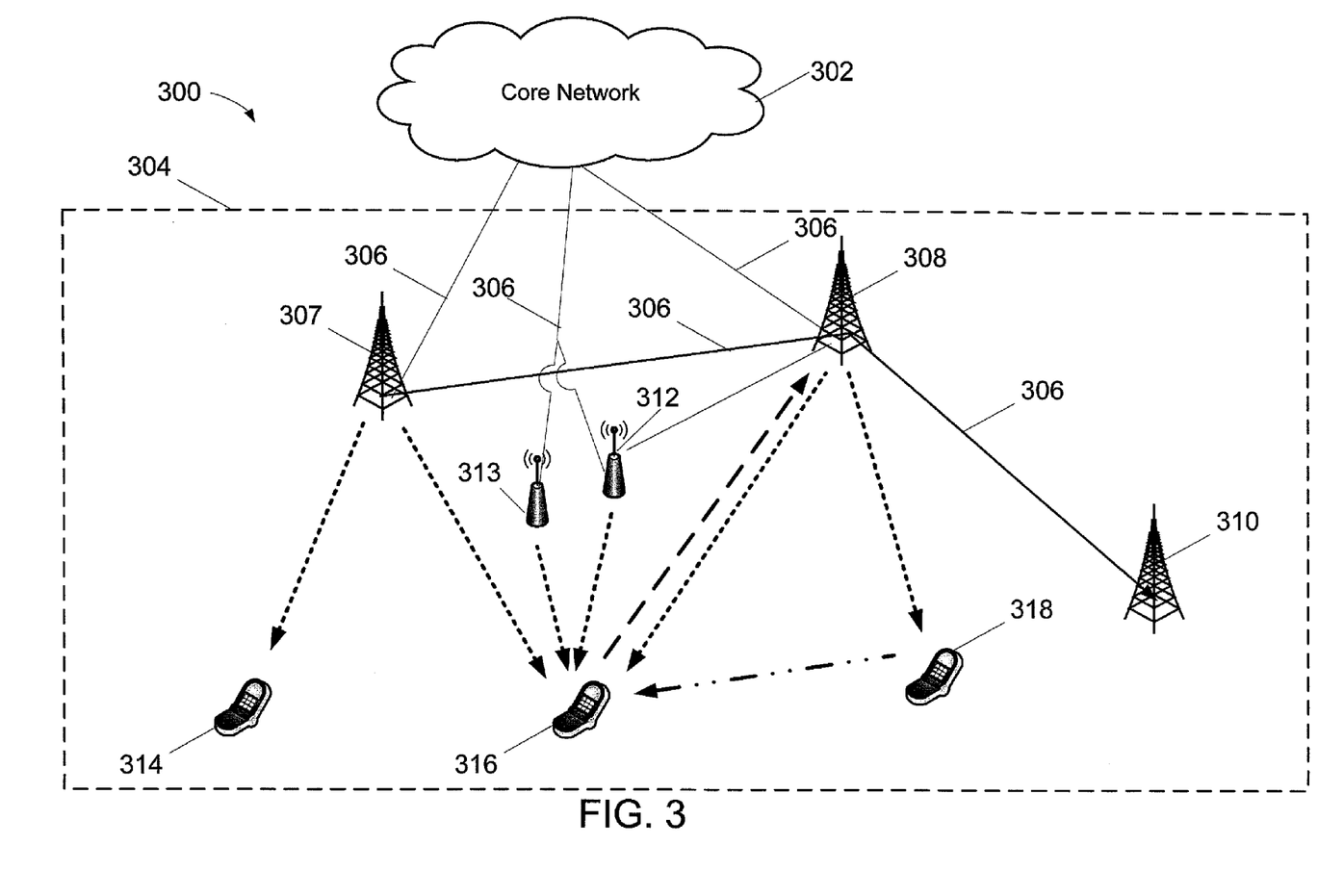
FIG. 3 shows an architectural overview of an example network architecture for use with embodiments of the invention.

FIG. 3 shows an architectural overview of an example network architecture for use with embodiments of the invention. Network 300 includes a "core network" (CN) 302 and a radio network 304. Core network 302 is the central part of network 300 and is normally operated by a communication services provider, and includes both wired and wireless components that provide mobile communication services over large areas to many users. Radio network 304 connects individual users to core network 302 in order to provide communication services, and includes both wireless and wired components, some of which may be operated by the communication services provider that operates core network 302, and some of which may be operated by others.

Radio network 304 includes numerous macro cells (not shown), which are covered by base stations 307, 308, and 310. Typically, each base station covers one macro cell (not shown). Mobile communication device 316 (also referred to as a "user equipment", UE, or MCD), such as a mobile telephone, is in wireless communication with base station 308. For example, MCD 316 is in wireless communication with base station 308 during an ongoing call. MCD 316 may also be in wireless communication with base station 307, relay node 312, femtocell 313, and/or MCD 318. MCD 314 is in wireless communication with base station 307.

Base stations 307, 308, and 310 are connected to core network 302 and to each other through link 306. In some embodiments, link 306 is a link capable of high data rates, for example, optical fiber.

The network architecture shown in FIG. 3 may be, for example, an evolved UMTS (Universal Mobile Telecommunications System) radio network. Such a radio network may also be referred to as and Long Term Evolution (LTE), Long Term Evolution Advance (LTE-A) or E-UTRA (Evolved UMTS Terrestrial Radio Access) network. In some embodiments of such an architecture, OFDMA may be used as a downlink multiple access scheme, and/or Single-Carrier Frequency-Division Multiple Access (SC-FDMA) may be used as an uplink multiple access scheme. Other OFDM/A schemes which may be used in accordance with various embodiments of the invention include Wi-Fi (IEEE 802.11a/b/g/n based), 3GPP LTE (Long Term Evolution), 3GPP LTE-Advanced, DVB-T, DVB-H, T-DMB, ISDB-T, MediaFLO forward link, DAB/EUREKA 147, DAB+, Digital Radio Mondiale, HD Radio, T-DMB, ISDB-TSB, Flash-OFDM, High Speed OFDM Packet Access (HSOPA), IEEE 802.20, IEEE 802.16e (Mobile WiMAX), WiBro, wireless Personal Area Network (PAN), and the Ultra wideband (UWB) IEEE 802.15.3a implementation suggested by WiMedia Alliance.

In some embodiments, MCD 316 transmits channel estimates to base station 308 to be analyzed by a measuring module (not shown) configured to determine if one or more carrier frequencies have crossed a threshold. In some embodiments, a threshold is a minimal acceptable level that a subcarrier is above when transmitted. The threshold may be crossed when received by a target MCD. In some embodiments, channel estimates may be determined by a test signal such as an impulse. Channel estimates may include impulse response curve, noise level measurements, amplitude levels of received subcarriers, interference level measurements of the whole received signal (e.g., a signal of multiple subcarriers), interference level measurements of a one or more sub-carriers, signal-over-noise-plus-interference (SINR) ratio measurements for the whole received signal and/or one or more sub-carriers, channel variations due to mobility (i.e., channel coherence time), channel coherence bandwidth, and/or environmental mobility of communication channels between a target MCD and a TD. For example, a subcarrier may be determined to be attenuated because a noise level to carrier frequency ratio is below a noise threshold.

The measuring module may be located in a base station, a core network, a relay station, a femtocell, or a MCD. The measuring module may be software, dedicated circuitry, a processor, microprocessor, or a computer system controlled by a backend network provider.

If the channel estimates indicate to the measuring module that a subcarrier crossed, or is likely to cross, a threshold, a selecting module (not shown) selects one or more transmitting devices to transmit the attenuated carrier frequencies to the target device. For example, if channel estimates indicated that attenuated subcarriers are being received by MCD 316, then MCD 316 is the target device to which selected transmitting device will transmit compensating subcarrier frequencies. A transmitting device is any device capable of wirelessly transmitting data. Examples include, but are not limited to, base stations, relay stations, femtocells, WLAN Access Points, and mobile phones. The selecting module may be located in a base station, a core network, a relay station, a femtocell, or a MCD. The selecting module may be software, dedicated circuitry, a processor, microprocessor, or a computer system controlled by a backend network provider.

In some embodiments, the selection performed by the selecting module may be centralized, i.e., a central selection module is used to selecting transmitting devices. In some embodiments, the selecting module is ad hoc, wherein a selecting module is incorporated into the transmitting devices and each device individually decides to be selected or not. In some embodiments, a combination of centralized and ad hoc selection is employed. Selection may be based on transmitting device characteristics such as channel impulse response profiles, transmission workload, physical distance, a predetermined order number, device type, level of measured attenuation, subcarrier frequency, cost of transmission, transmission noise or any combination thereof. Transmitting device selection is more fully explained with reference to FIG. 6, below.

Referring to FIG. 3, base station 307, relay station 312, femtocell 313, and/or MCD 318 may be selected to be helping transmitting devices for MCD 316. In some embodiments, core network 302 sends data assigned to the attenuated subcarriers to the selected helping transmitting devices. The selected helping transmitting devices then transmit that data over the attenuated subcarrier frequencies with appropriate coding and modulation schemes. In some embodiments, the base station in the macro cell where the attenuation is occurring forwards the data assigned to the attenuated subcarriers to the selected helping transmitting devices. In some embodiments, the data is transmitted wirelessly, and in some embodiments the data is transmitted over a physical link, e.g., link 306.

Referring again to FIG. 3, base station 308 may transmit the data assigned to the attenuated subcarriers over link 306 to base station 307, relay node 312, and femtocell 313. Base station 308 may also transmit the data wirelessly to MCD 318. Base station 307, relay node 312, femtocell 313, and MCD 318 may then transmit that data over the attenuated subcarriers frequencies with appropriate coding and modulation schemes. The data is then received by target MCD 316.

Figure 4A:
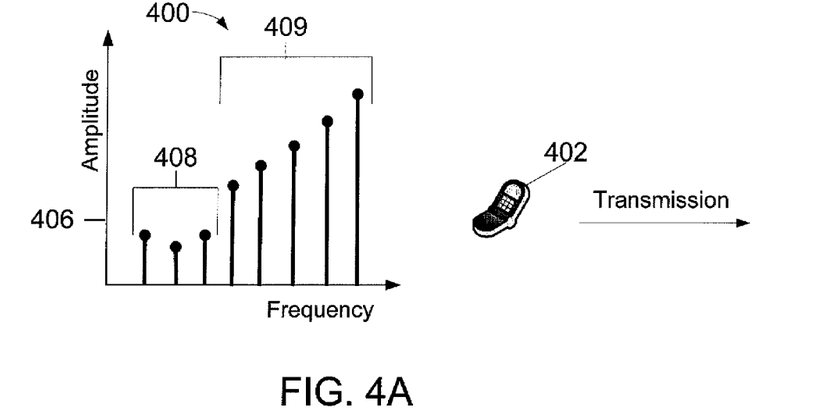
FIG. 4A is a graphical representation of channel estimates for use with embodiments of the invention.

FIG. 4A is a graphical representation of channel estimates for use with embodiments of the invention. Channel estimates may include channel response subcarrier group 400, which represent the various amplitude signal strengths as received by target MCD 402. Amplitude threshold 406 is a level below which subcarriers are deemed strongly attenuated. Amplitude threshold 406 may be fixed, adjustable, or predetermined. For example, amplitude threshold 406 may adjust according to the measured noise level observed over a communication channel. Channel response subcarriers 408 are below amplitude threshold 406. Channel response subcarriers 409 are above amplitude threshold 406. In some embodiments, target MCD 402 transmits channel estimates to be analyzed by a measuring module (not shown) configured to determine if one or more carrier frequencies crossed a threshold.

Figure 4B:
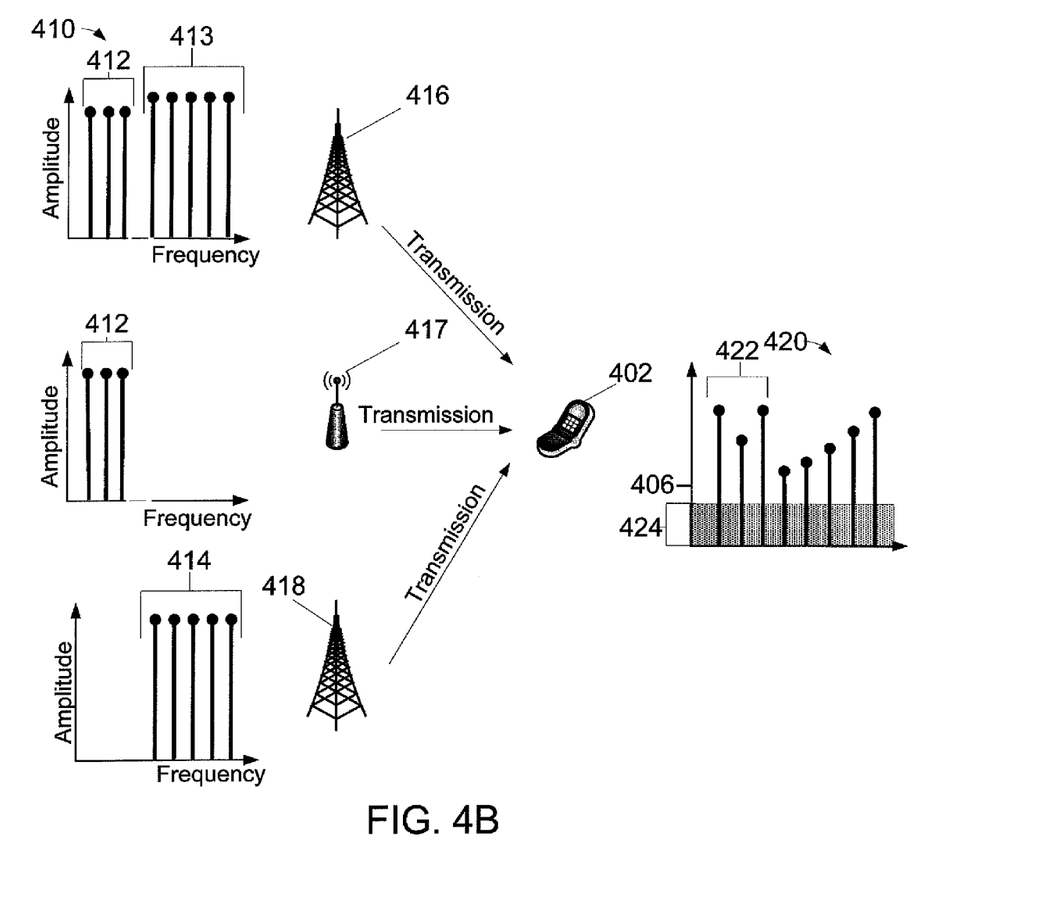
FIG. 4B is a graphical representation of subcarriers transmitted in a multipath environment in accordance with an embodiment of the invention.

FIG. 4B is a graphical representation of subcarriers transmitted in a multipath environment in accordance with an embodiment of the invention. Subcarrier group 410 may be transmitted from a selected transmitting device such as base station 416. Subcarriers 412 correspond to attenuated subcarriers 408. That is, subcarriers 412 are the same subcarrier frequencies as subcarriers 408 and will carry information assigned to subcarrier frequencies 408. Subcarriers 413 may be one or more subcarriers that base station 416 is also responsible for transmitting. For example, base station 416 may transmit subcarriers 413 to MCDs in a macro cell base station 416 is located in. In some embodiments, target MCD 402 may be located in a different macro cell than base station 416. Thus, base station 416 may purposely transmit subcarriers to more than one macro cell.

Subcarriers 412 correspond to attenuated subcarriers 408 and may be transmitted from relay node 417. Relay node 417 may be a dedicated relay node that may transmit subcarriers measured below an amplitude threshold. In some embodiments, a base station or a femtocell may serve a similar function.

Subcarriers 414 correspond to subcarriers 409. Subcarriers 414 may be transmitted by base station 418. Base station 418 may be in the same macro cell from which channel response subcarrier group 400 originated. That is, base station 418 may be in the same macro cell as target MCD 402, which is receiving subcarriers 408 attenuated below amplitude threshold 406 when transmitted by base station 418. Although base station 418 would typically transmit subcarriers 412 as well, base station 418 may transmit subcarriers that are received by target MCD 402 above an amplitude threshold because other transmitting devices (e.g., base station 416 and relay node 417) are transmitting subcarriers that are received by target MCD 402 below an amplitude threshold when transmitted by base station 418. Because base station 418 may have a total output power budget, base station 418 may save power or boost subcarriers 414 to correspond to the power saved by not transmitting subcarriers 412.

Subcarrier group 420 corresponds to transmitted subcarriers 412 and 416 as received by target MCD 402. Although subcarrier group 420 has some faded subcarriers, none of the subcarriers are below amplitude threshold 406 or within transmission noise 424.

With multiple transmitting devices (e.g., base station 416 and relay node 417) transmitting the same subcarrier group or sub-band (e.g., subcarriers 412), a Localized Single Frequency Network (LSFN) is created. That is, two or more transmitting devices are transmitting simultaneously or near simultaneously subcarriers 412 over a portion of a wireless network. Because a LSFN requires a level of synchronization time between two transmitting devices, "simultaneously" or "near-simultaneously" will be understood to mean transmission time offsets smaller than a guard interval of a OFDM/A data frame.

In some embodiments, target MCD 402 may receive subcarriers 412 from base stations 416 and 418 and relay node 417. Since the channel impulse responses of transmitting devices are typically statistically independent with respect to a target MCD, it is highly improbable that subcarriers 412 will also undergo high attenuation when transmitted by base station 416 and relay node 417. Thus, target MCD 402 will receive (at a very high probability at least) a signal of high quality over the whole signal bandwidth. In some embodiments, channel estimate data is collected and analyzed between target MCD 402 and transmitting devices 416 and 417 to determine whether attenuation or other signal anomalies occur in the same frequency spectrum as subcarriers 412. In some embodiments, a transmitting device may be selected to transmit detected subcarrier frequencies by having the most effective impulse response to boost the attenuated frequencies.

Because, in some embodiments, more than one transmitting device is transmitting an attenuated subcarrier group, the selected transmitting devices need only use a small portion of their output power budge in "helping" the base station of a target MCD boost the attenuated subcarrier group. Thus, the target MCD can receive a high quality signal without a base station in the same macro cell as the target MCD boosting the attenuated subcarrier group.

It will be understood that FIG. 4B demonstrates only one embodiment in accordance with the invention and that there may be many variations or additions within the scope of the invention. For example, a first base station may send a signal comprising multiple sub-carriers, wherein a MCD receives some of these subcarriers strongly attenuated. A second base station may simultaneously (or near-simultaneously) transmit data assigned to the attenuated carrier frequencies over the same carrier frequencies that the first base station is transmitting and the MCD receives strongly attenuated.

Another example within the scope of an embodiment of the invention is a first base station may address several MCDs with the same information, (e.g., point-to-multipoint transmission in a push-to-talk communication session). Because transmission paths are usually statistically independent, it is unlikely that all or the same subcarriers transmitted from the first base station to the several MCDs are strongly attenuated. If, however, some carriers are attenuated for a sub-set of the point-to-multipoint connections, the first base station could still maintain the transmission of all subcarriers while a second base station transmits the detected attenuated subcarrier frequencies.

Figure 5:
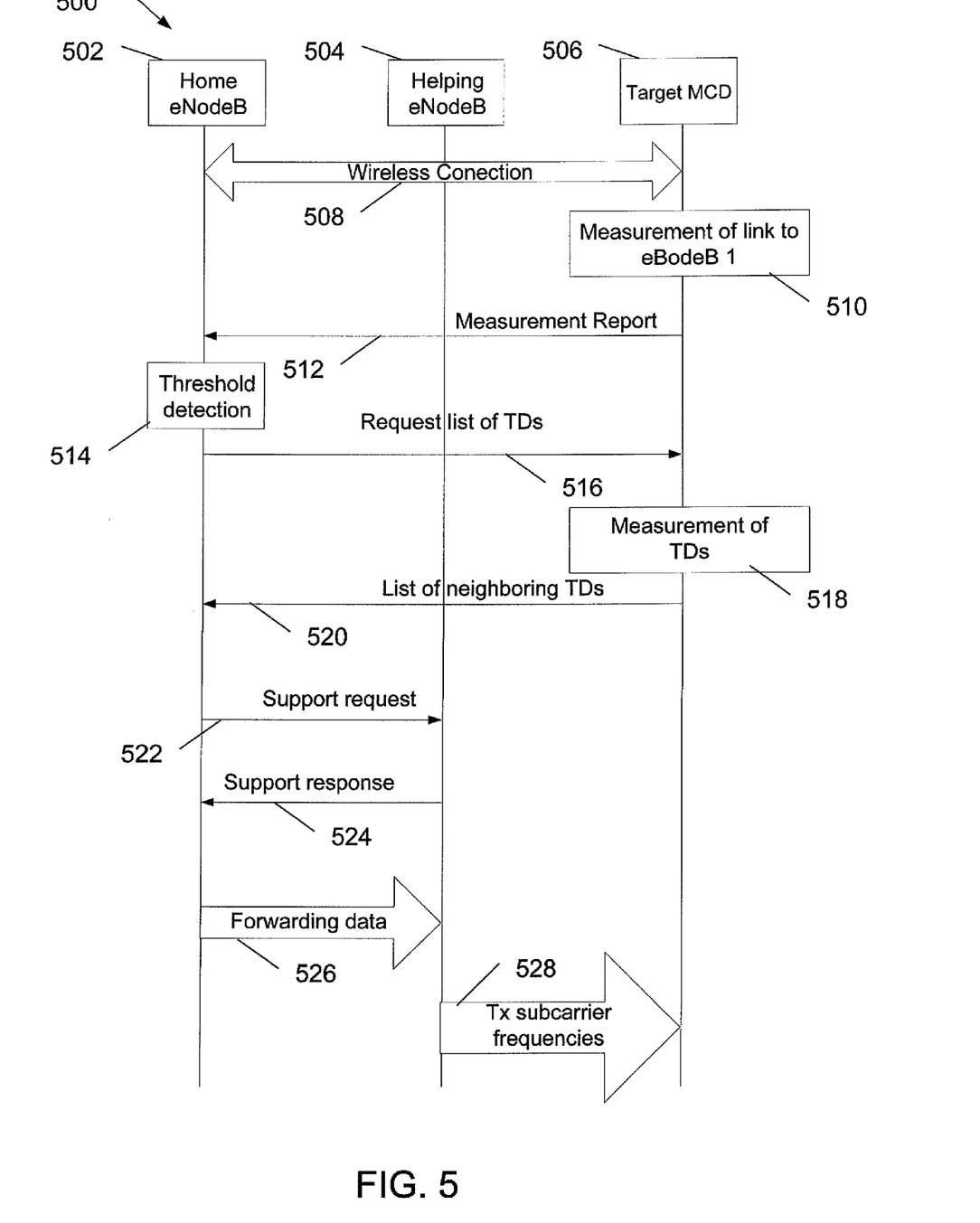
FIG. 5 shows a message sequence chart for measurement, detection, and support phases of an embodiment in accordance with the invention.

FIG. 5 shows a message sequence chart 500 for measurement, detection, and support phases of an embodiment in accordance with the invention. At 508, a wireless connection is established between home eNodeB 502 and target MCD 506. In some embodiments, home eNodeB 502 is located in the same macro cell as target MCD 506.

At 510, target MCD 506 performs a measurement of the communication channel with home eNodeB 502. At 512, target MCD 506 transmits the measurement results, including channel estimation data, to home eNodeB 502. At 514, a measurement module within home eNodeB 502 detects at least one subcarrier below a threshold. At 516, home eNodeB 502 requests target MCD 506 for a list of transmission devices (TDs) within transmission range of target MCD 506. At 518, target MCD 506 performs a measurement to find out which TDs are within its range. At 520, target MCD 506 transmits a list of transmitting devices within range to home eNodeB 502.

At 522, home eNodeB 502 transmits a support request message to all transmitting devices within range of target MCD 506. In some embodiments, the support request message may include the frequencies of the attenuated subcarriers. In some embodiments, a support request message may be sent to a central selecting module configured to select the one or more transmitting devices to transmit carrier frequencies that crossed a threshold. In some embodiments, the selection module may reside in the transmitting devices and thus each device decides to be a helping transmitting device or not. In some embodiments, a combination of centralized and ad hoc decision making is applied. Selecting transmitting devices is more fully explained in FIG. 6, below. It will be understood that the term "helping transmitting device" and similar terms will mean a device that transmits carrier frequencies which correspond to carrier frequencies transmitted by another transmitting device and have been detected to have crossed a threshold.

Helping eNodeB 504 receives the support request message and at 524 transmits a support request response message to Home eNodeB 502 indicating it will support Home eNodeB 502. At 526, Home eNodeB 502 forwards the data assigned to the attenuated subcarriers to helping eNodeB 506. In some embodiments, information about coding and modulation settings is also included. In some embodiments, the data is forwarded over a wireless communication link. In some embodiments, the data is forwarded over a physical communication link such as optical fiber.

At 528, helping eNodeB 506 transmits the data to target MCD 506 over the attenuated carrier frequencies.

Figure 6:
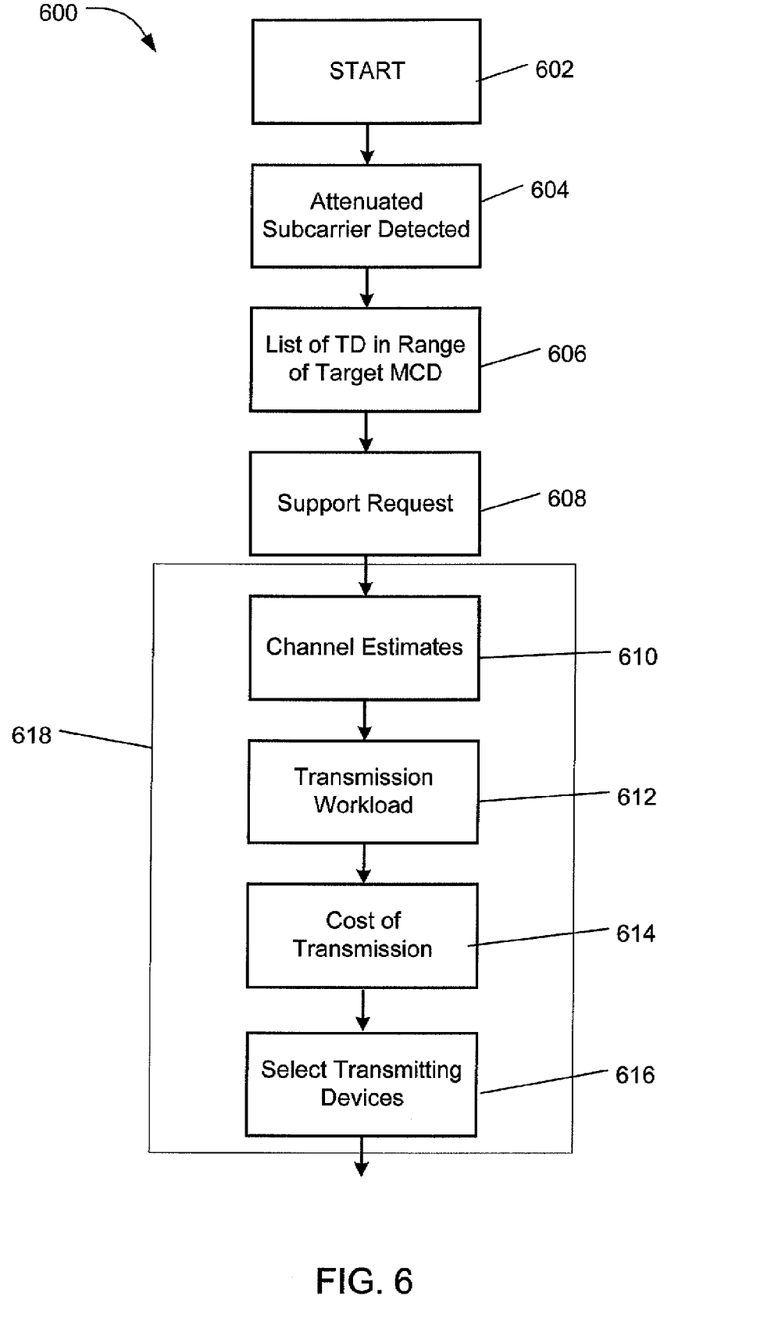
FIG. 6 shows a flowchart of a transmitting device selection process of an embodiment in accordance with the invention.

FIG. 6 shows a flowchart of a transmitting device selection process 600 of an embodiment in accordance with the invention. At 602, process 600 starts. At 604, an attenuated subcarrier or subcarriers are detected for a target MCD. At 606, the target MCD transmits a list of transmitting devices within range of the target MCD. In some embodiments, "in range" may be determined by sending a request signal and listing every device that responds as being in range. In some embodiments, an impulse response between a transmitting device and the target MCD determines if a transmitting device is within range. If the impulse response of a transmitting device does not conform to an impulse response profile, then the transmitting is deemed to be out of range. For example, an impulse response profile may accept an impulse response of a transmitting device which, at most, slightly attenuates detected attenuated subcarrier frequencies. In some embodiments, channel estimates are included in the list of transmitting devices in range.

At 608, a support request is sent. In some embodiments a support request is sent to each device within range. In some embodiments, the support request is sent to a central selecting module 618. The selecting module 618 may be located in a base station, a core network, a relay station, or a MCD. The selecting module 618 may be software, dedicated circuitry, a processor, microprocessor, or a computer system controlled by a backend network provider.

At 610, the selecting module 618, checks channel estimates of transmitting devices within range with respect to the target MCD. For example, in some embodiments, the impulse response between a target MCD and transmitting device may be included in the support request. In some embodiments, the selecting module 618 may request the transmitting device to conduct impulse response tests with the transmitting devices within range and forward the data to the selecting module 618. At 610, the selecting module 618 may select transmitting devices which will least attenuate the detected attenuated subcarriers. In some embodiments, the selecting module 618 may only filter out transmitting devices in range if the impulse response does not meet a minimum profile requirement.

At 612, the selecting module 618 may select transmitting devices with the lowest transmission workload. In some embodiments, the selecting module 618 may only filter out transmitting devices if the transmission workload is above a threshold. Transmission workload may be based on total power output of a transmission device, bandwidth use, or number of connected users. These values may be estimated values, current values, or past values.

At 614, a cost of transmission is determined for a transmitting device. The selecting module 618 may select transmitting devices which will transmit data with the least cost. In some embodiments, the selecting module 618 may only filter out transmitting devices having transmission costs above a threshold.

At 616, the selecting module 618 selects which transmitting devices will transmit data to the target MCD based on the above determined transmitting device characteristics (i.e., channel estimates 610, transmission workload 612, and cost of transmission 614). The selecting module 618 may be associated with one or more of the transmitting devices, may be centralized, or may be a combination thereof. After being selected, the transmitting devices will begin receiving data and transmit that data over the detected attenuated carrier frequencies to be received by a target MCD.

It will be understood that the process shown in FIG. 6 is only one possible sequence for process 600 and that there may be many variations or additions to the process. For example, process 600 may select transmitting devices by a predetermined order, a transmitting device type (e.g., base station, relay station, MCD), or other transmitting device characteristics. Further, the arrangement and weight given to selections based on transmitting device characteristics may vary.

Figure 7:
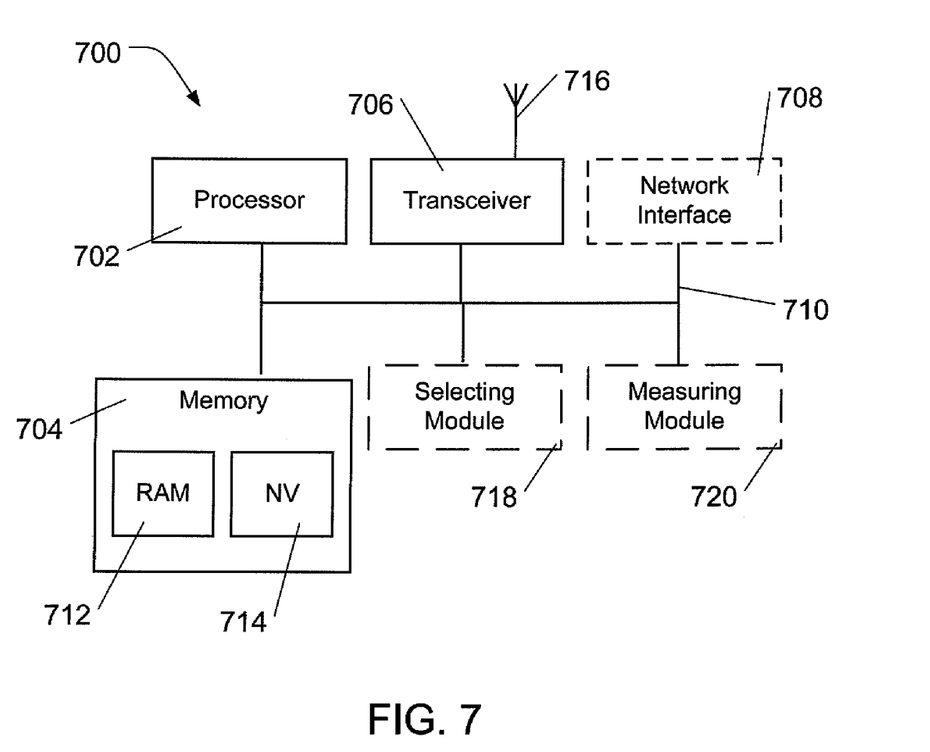
FIG. 7 shows a block diagram of an example architecture for a transmitting device for use with embodiments of the invention.

FIG. 7 shows a block diagram of an example architecture for a transmitting device 700 (TD). Examples of TDs include, but are not limited to, base stations, eNodeBs, relay stations, eNodeRs, and mobile phones. TD 700 includes processor 702, memory 704, transceiver 706, network interface 708, selecting module 718, and measuring module 720, connected by bus 710. In some embodiments, memory 704 may include random access memory 712, such as conventional DRAM, and non-volatile memory 714, such as conventional flash memory, for storing the firmware that operates TD 700, as well as other parameters and settings that should be retained by TD 700.

Transceiver 706 includes antenna 716, which is used for communicating wirelessly with one or more MCDs and/or TDs. In some embodiments, for example in eNodeBs and NodeRs, network interface 708 connects the TD 700 to the core network, and may be a conventional wired network interface, such as a optical fiber interface, DSL interface, an Ethernet interface, or a USB interface that connects to an external computer or network interface device for connection to the core network. In some embodiments, network interface 708 connects the TD 700 to other TDs such as eNodeBs and NodeRs. Alternatively, network interface 708 may be a wireless network interface that communicates with the core network via a wireless local-area network, a wireless metropolitan area network, or a wireless wide area network.

In some embodiments, selecting module 718 may be software, dedicated circuitry, a processor, or a microprocessor. In some embodiments, measuring module 720 may be software, dedicated circuitry, a processor, or a microprocessor.

It will be understood that the architecture shown in FIG. 7 is only one possible architecture for TD 700, and that there may be many variations or additions to the architecture. For example, TD 700 may include I/O devices, such as a display (not shown), a smart card interface, and a smart card (not shown), to verify that TD 700 is authorized for operation, or two or more antennae for TD 700 to implement a multiple input, multiple output modulation scheme.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for efficiently transmitting data modulated onto carrier frequencies, the method comprising:
    transmitting data modulated onto one or more carrier frequencies by a first transmitting device to a user equipment;
    detecting that a received signal property of a carrier frequency of the one or more carrier frequencies used for transmission is below a minimum quality threshold;
    receiving identifiers of one or more helping transmitting devices within range of the user equipment;
    selecting, responsive to said detecting and said receiving, a helping transmitting device of the one or more helping transmitting devices to transmit the data modulated onto the carrier frequency;
    transmitting, responsive to said selecting, data assigned to the carrier frequency to the selected helping transmitting devices, wherein the data is to be modulated onto the carrier frequency and transmitted by the selected helping transmitting device, and wherein the first transmitting device and the selected helping transmitting device transmit the data modulated onto the carrier frequency nearly simultaneously to form a localized single frequency network.

2. The method of claim 1, wherein detecting that the received signal property of the carrier frequency is below the minimum quality threshold comprises detecting that the received signal property of the carrier frequency is below the minimum quality threshold partly based on a channel estimate.

3. The method of claim 1, wherein selecting the helping transmitting device to transmit the data modulated onto the carrier frequency comprises selecting the helping transmitting device to transmit the data modulated onto the carrier frequency at least partly based on a transmission workload of the selected helping transmitting device.

4. The method of claim 1, wherein the minimum quality threshold comprises a signal to noise ratio.

5. The method of claim 1, wherein the minimum quality threshold comprises a signal amplitude threshold.

6. The method of claim 1, further comprising deselecting the first transmitting device from transmitting data modulated onto the detected carrier frequencies.

7. The method of claim 1, wherein said receiving identifiers of one or more helping transmitting devices within range of the user equipment comprises receiving the identifiers of the one or more helping transmitting devices from the user equipment.

8. The method of claim 1, wherein said receiving identifiers of one or more helping transmitting devices within range of the user equipment comprises receiving, from the user equipment, estimates of the channels between the one or more helping transmitting devices and the user equipment.

9. A wireless communication system, comprising:
    measuring circuitry to determine that a received signal property of a carrier frequency on which data is transmitted wirelessly to a mobile communication device is below a minimum quality threshold, the determination at least partly based on a channel estimate determined and transmitted to the wireless communication system by the mobile communication device;
    selecting circuitry to select, responsive to said determination by the measuring circuitry, a helping transmitting device to transmit the data modulated onto the carrier frequency, the selection at least partly based on received identifiers of one or more helping transmitting devices within range of the mobile communication device, wherein the received identifiers of the one or more helping transmitting devices within the range of the mobile communication device are to be provided to the wireless communication system by the mobile communication device.

10. The wireless communication system of claim 9, further comprising:
    a network interface to transmit the data to be modulated onto the carrier frequency to the helping transmitting device over a wired link.

11. The wireless communication system of claim 9, further comprising:
    a network interface to transmit the data to be modulated onto the carrier frequency to the helping transmitting device over an optical link.

12. The wireless communication system of claim 9, wherein the measuring circuitry resides in a base station.

13. The wireless communication system of claim 9, wherein the selecting circuitry resides in a base station.

14. The wireless communication system of claim 9, wherein the measuring circuitry or the selecting circuitry resides in a core network.

15. The wireless communication system of claim 9, wherein the received identifiers of the one or more helping transmitting devices within the range of the mobile communication device are provided to the wireless communication system by the mobile communication device along with estimates of the channels between the one or more helping transmitting devices and the mobile communication device.

16. A transmitting device, the transmitting device comprising:
    a transceiver to receive and transmit data modulated onto one or more carrier frequencies;
    a processor; and
    memory unit communicatively connected to the processor and having computer code stored thereon that, in response to execution by the processor, causes the transmitting device to:
        receive identifiers of one or more helping transmitting devices within range of a mobile communication device, wherein said receive identifiers of one or more helping transmitting devices within range of a mobile communication device comprises receive, from the mobile communication device, estimates of channels between the one or more helping transmitting devices and the mobile communication device;

select, responsive to said reception, a helping transmitting device from the one or more helping transmitting devices, to transmit data modulated onto a carrier frequency to the mobile communication device, responsive to said detected carrier frequency having received signal properties below a minimum quality threshold, and transmit, responsive to said selection, data assigned to the carrier frequency to the helping transmitting device, wherein the data is to be modulated onto the carrier frequency and transmitted by the selected helping transmitting device to the mobile communication device.

17. The transmitting device of claim 16, wherein the memory unit further has computer code stored thereon that, in response to execution by the processor, causes the transmitting device to determine, based at least partly on a channel estimate, that the carrier frequency has the received signal property below the minimum quality threshold.

18. The transmitting device of claim 16, wherein the transmitting device is selected from a group consisting of a relay station, a femtocell base station, an access point and a macro base station.

19. The transmitting device of claim 16, wherein the transceiver is to receive and transmit data modulated onto the one or more carrier frequencies in accordance with an orthogonal frequency-division multiplexing scheme.

20. The transmitting device of claim 16, wherein the transceiver is configured to receive and transmit data modulated onto the one or more carrier frequencies in accordance with an orthogonal frequency-division multiple access scheme.

21. The transmitting device of claim 16, wherein the threshold is adjustable.

22. The transmitting device of claim 16, wherein said receive identifiers of one or more helping transmitting devices within range of a mobile communication device comprises receive the identifiers of the one or more helping transmitting devices from the mobile communication device.

* * * * *